United States Patent [19]

Lambert

[11] 4,049,973
[45] Sept. 20, 1977

[54] TIMER CONTROLLED SPACE THERMOSTAT WITH BATTERY OPERATED TIMER

[75] Inventor: Rudolph J. Lambert, Webster Groves, Mo.

[73] Assignee: Emerson Electric Co., St. Louis, Mo.

[21] Appl. No.: 680,142

[22] Filed: Apr. 26, 1976

[51] Int. Cl.² .............................................. H02J 9/00
[52] U.S. Cl. ..................................... 307/66; 307/141; 236/47; 337/331
[58] Field of Search .................. 307/141, 141.4, 141.8, 307/66, 117; 337/302, 303, 331; 236/46 R, 47; 58/33, 152 A, 23 BA; 219/492; 165/12

[56] References Cited
U.S. PATENT DOCUMENTS

| 3,917,165 | 11/1975 | Cross | 236/47 |
| 3,929,284 | 12/1975 | Prewarski | 236/47 |
| 3,948,441 | 4/1976 | Perkins | 236/47 |

Primary Examiner—Robert K. Schaefer
Assistant Examiner—Morris Ginsburg
Attorney, Agent, or Firm—Paul A. Becker, Sr.

[57] ABSTRACT

A timer controlled space thermostat includes a timer, a rechargeable battery for providing the electrical power to operate the timer, circuit means for recharging the battery, and two single-pole, double-throw temperature responsive switches. One conductive position of each switch enables the energizing of space conditioning apparatus control means, the other conductive position of each switch enables the energizing of the recharging circuit means, and the short timer period incidental to the movement of the switch between the conductive positions provides a sufficient time to ensure de-energizing of the space conditioning apparatus control means prior to the energizing of the recharging circuit means.

8 Claims, 11 Drawing Figures

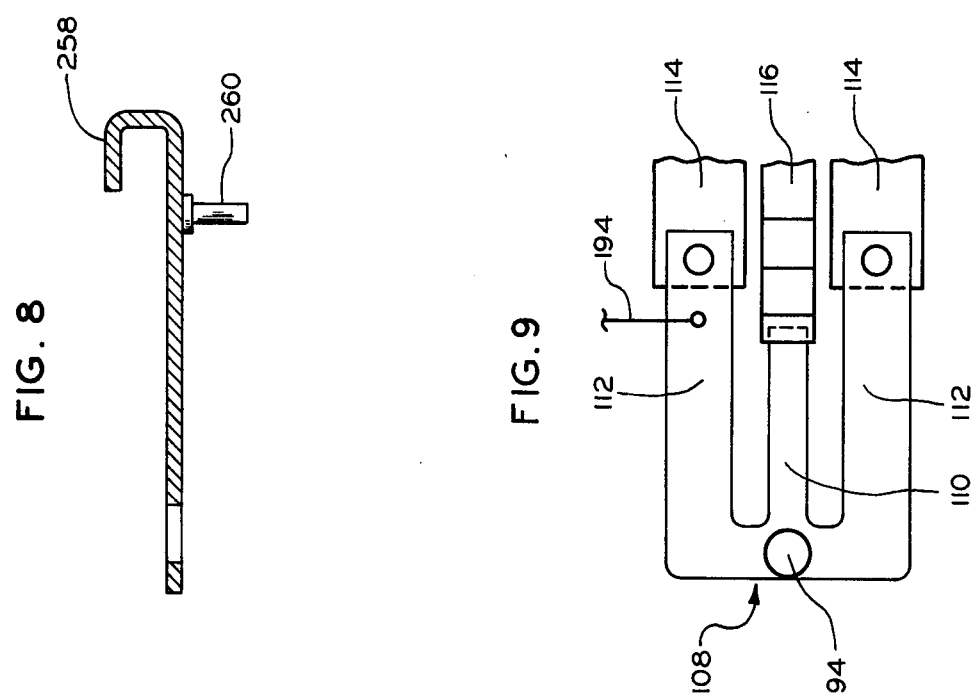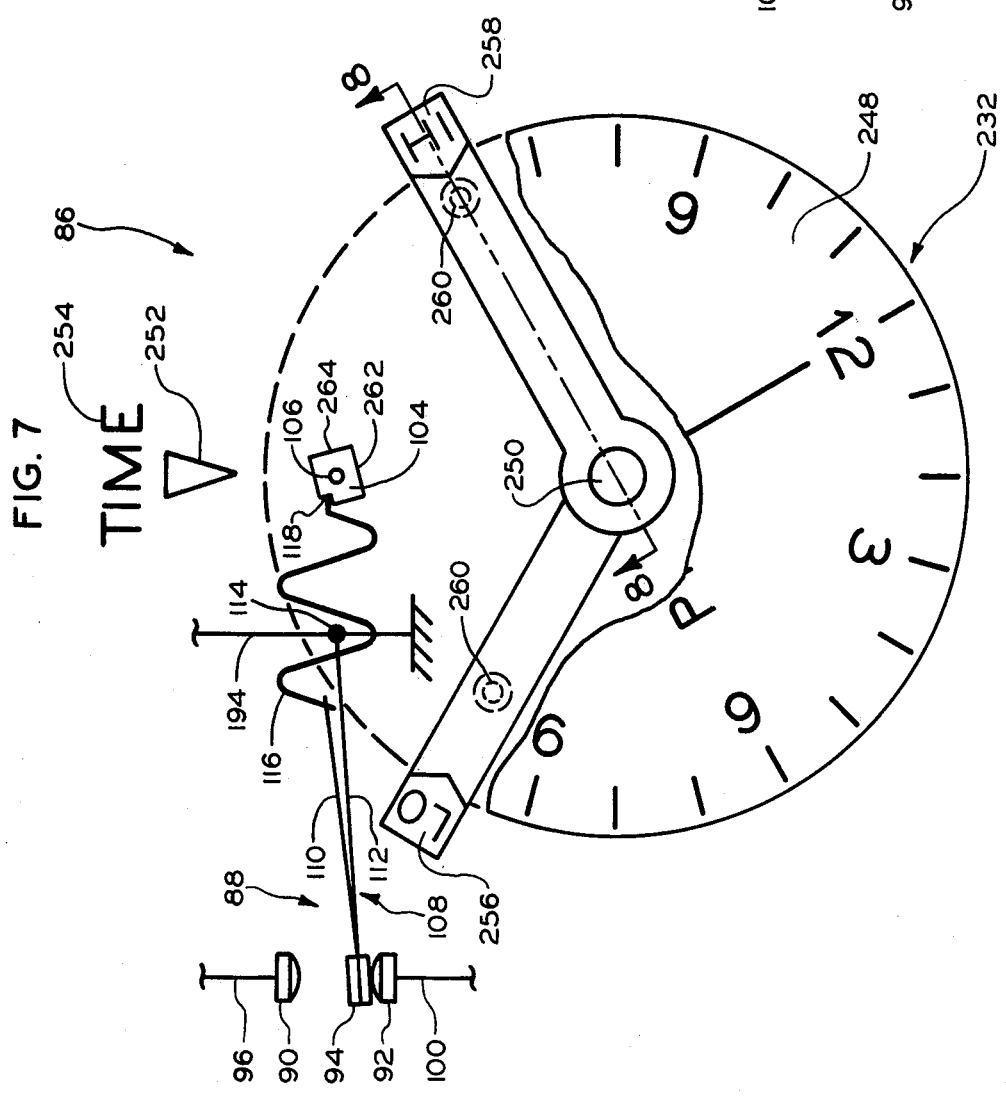

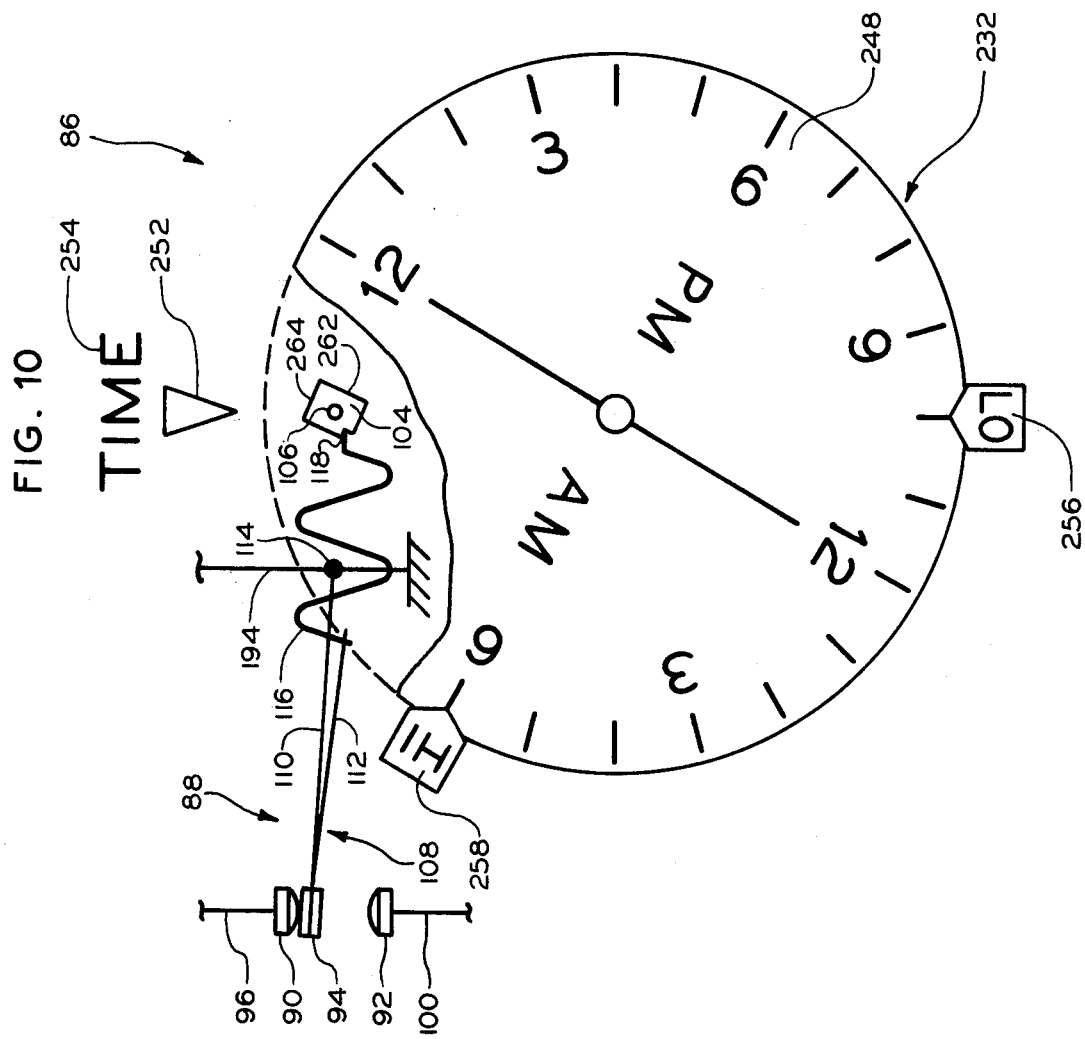

TIMER CONTROLLED SPACE THERMOSTAT WITH BATTERY OPERATED TIMER

This invention relates to timer controlled space thermostats for automatically changing the temperature level at which a controlled space is to be maintained, from one preselected level to another at preselected clock settings, and particularly to a timer controlled space thermostat wherein the electrical power to operate the timer is provided by a rechargeable storage battery and wherein the thermostat includes circuit means for recharging the battery.

Application Ser. No. 660,624, filed Feb. 23, 1976, for "TIMER CONTROLLED SPACE THERMOSTAT WITH BATTERY OPERATED TIMER" by Willard J. Iberg, et al., assignors to the assignee of the present invention, discloses a timer controlled space thermostat adapted for replacement of a conventional space thermostat, such replacement requiring no additional wiring or components. The referenced timer controlled space thermostat includes an electrically operated timer, a rechargeable storage battery to provide the electrical power to operate the timer, two temperature responsive switches for controlling operation of space conditioning apparatus control means, a single-pole, double-throw timer operated switch to alternately complete a circuit through one and then the other of the temperature responsive switches for controlling the energizing of the space conditioning apparatus control means, and a recharging circuit connected to the battery.

While the referenced thermostat, illustrated therein as a thermostat for controlling both heating and cooling systems, performs quite satisfactorily during operation of the cooling system, a problem is encountered during operation of the heating system, the problem being that the heating system controller sometimes remains energized after the controlling temperature responsive switch in the thermostat has been satisfied. This problem appears to exist only when the heating system controller is an electromagnetically operated device, such as a solenoid or relay operated gas valve, and even then, the problem does not exist with all electromagnetically operated devices. Nor does the problem exist when the heating system controller is a thermoelectrically operated device, such as a conventional bimetal operated gas valve wherein the valve is moved to its opening position by a bimetal which is responsive to heat from a heater coil associated with the bimetal.

It is believed that the occasional failure of some electromagnetically operated gas valves to close is due to the fact that, in the referenced application, the gas valve is constantly connected to the power source. More specifically, in the referenced application, when the system selector switch is in the "HEAT" position, the heating system controller is connected to the secondary winding of a transformer through a parallel circuit, one branch being the battery recharging circuit comprising a charging resistor and diode, and the other branch comprising the two temperature responsive switches, the timer operated switch, and a heating anticipation resistor. When the temperature responsive switches are in a satisfied position, the battery is recharged through the resistor and diode branch circuit. The rectified current flow is quite small, such as approximately 5 milliamperes. While this small rectified current flow is much too small to effect pull-in of a typical solenoid or relay operated gas valve, such valves generally requiring approximately 200 to 400 milliamperes to effect pull-in, it is believed that the recharging circuit current and voltage is effective to prevent the magnetic force, which exists when the valve is energized, from decaying to the level to which it must decay to enable the valve to drop out. It is believed that this prevention of the decay of magnetic force, combined with varying construction parameters such as the magnetic characteristics of the iron in the magnetic circuit and the spring return forces on the solenoid plunger or relay armature, cause the valve to occasionally stick open.

It should be noted that while some of the existing solenoid and relay operated gas valves in existing installations would stick open as described above, there are others that would not. However, since the referenced thermostat is intended as a simple replacement for existing conventional space thermostats without requiring additional wiring or additional components, such as a different gas valve, it is considered essential that the problem be solved within the circuitry of the thermostat. It should also be noted that while the high temperature limit switch, in the referenced application, will function to prevent an unsafe condition whenever the gas valve remains open, such condition is obviously unacceptable in that the desired temperature levels are not maintained.

I have determined that the aforementioned problem can be overcome by providing a very short time, such as approximately 40 milliseconds, between the de-energizing of the gas valve and the energizing of the battery recharging circuit.

An object of the present invention, therefore, is to provide an improved timer controlled space thermostat which may replace an existing conventional space thermostat without requiring additional wiring or components, and including battery operated electrical timing means, circuit means operative to recharge the battery, and means for completely de-energizing space conditioning apparatus control means before energizing the recharging circuit means.

In a preferred embodiment of the invention, a timer controlled space thermostat includes a battery operated timer, circuit means for recharging the battery, and two single-pole, double-throw temperature responsive switches for controlling both the operation of the space conditioning apparatus control means and the recharging circuit means. One conductive position of each switch controls the space conditioning apparatus control means, the other conductive position controls the recharging circuit means, and a short time period between conductive positions provides a sufficient time for the space conditioning apparatus control means to be completely de-energized.

Other objects and advantages of the invention will become apparent from the following description when read in connection with the accompanying drawings.

In the drawings:

FIGS. 1, 2, 3, and 4 are diagrammatic illustrations of a heating-cooling system including a timer controlled space thermostat constructed in accordance with the present invention and showing the system in the "HEAT" mode and showing different operating positions of the temperature responsive switches and ot the battery operated timer;

FIG. 7 is a fragmentary front view of the timer at the clock time shown in FIGS. 1, 2, 5, 6, and 11;

FIG. 8 is a cross-sectional view of a switch actuator arm taken on line 8—8 of FIG. 7;

FIG. 9 is a plan view of the switch blade utilized in the timer operated switch;

FIG. 10 is a fragmentary front view of the timer at the clock time shown in FIGs. 3 and 4.

DESCRIPTION OF THE PREFERRED EMBODIMENT

FIGS. 1 through 6 are constructed the same; only the operating positions of the temperature responsive switches, the timer and associated timer switch, and the system selector switch are different. Therefore, the following description of the components and their circuit connections in FIG. 1 also applies to FIGS. 2 through 6.

Figure 1:
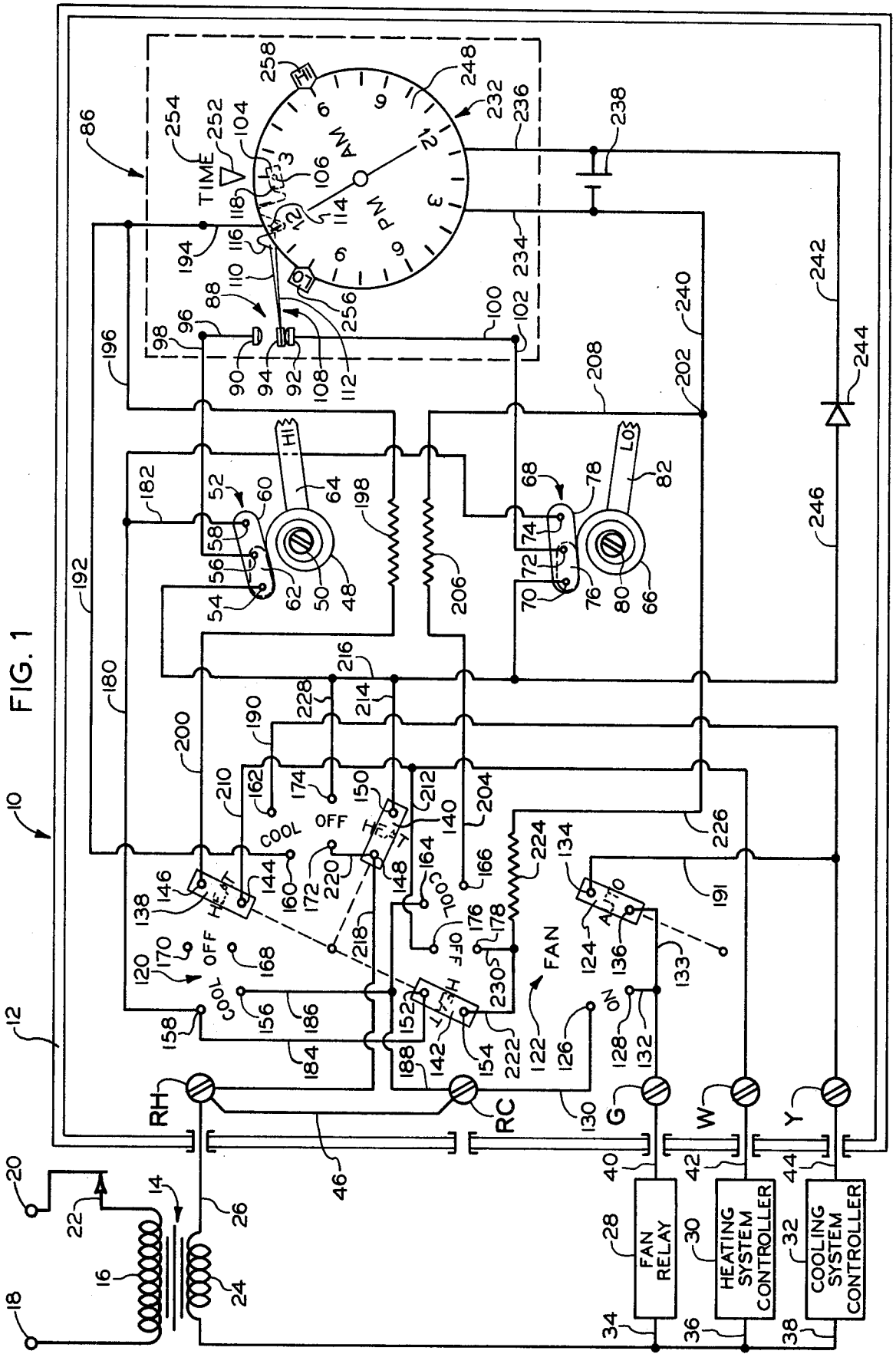

Referring to FIG. 1, a timer controlled space thermostat for controlling the temperature in a conditioned space is generally indicated at 10 and includes a housing 12. A voltage step-down transformer 14 has its primary winding 16 connected across terminals 18 and 20 of a conventional 120 volt alternating current power source through a high temperature limit switch 22. The contacts in the limit switch 22 are normally closed, opening only in response to an abnormally high temperature in the plenum of a furnace (not shown) to effect de-energizing of transformer 14.

One side of the transformer secondary winding 24 is connected by a lead 26 to a screw terminal RH secured in housing 12. A fan relay 28, a heating system controller 30, and a cooling system controller 32 are connected by leads 34, 36, and 38, respectively, to the other side of secondary winding 24, and by leads 40, 42, and 44, respectively, to screw terminals G, W, and Y, respectively, in housing 12.

Although not shown, it is to be understood that the fan relay 28, the heating system controller 30, and the cooling system controller 32 can be of any conventional means such as a fan relay coil, a gas valve solenoid or relay winding, and a compressor relay coil, respectively, for controlling the energizing of conventional space conditioning apparatus such as a forced warm air furnace and refrigeration unit.

The above described circuitry external to the thermostat housing 12 is conventional circuitry utilized for a conventional 4-wire heating-cooling space thermostat. A fifth screw terminal RC is also secured in housing 12 and is connected to terminal RH by a lead 46 which can be removed. Terminal RC enables thermostat 10 to also be used to replace a conventional 5-wire heating-cooling thermostat. If the existing installation is a 5-wire system, lead 46 is removed, terminal RC is connected to one side of the secondary winding of a second transformer (not shown), and the leads 34 and 38 for the fan relay 28 and cooling system controller 32, respectively, are connected to the other side of the secondary winding of the second transformer instead of being connected to the secondary winding 24 of transformer 14. Since the operation of the space thermostat 10 is essentially the same for the 4-wire and 5-wire systems, only operation of the 4-wire system will be described.

The inner end of a spirally wound bimetal strip 48 is rigidly attached to a first rotatably adjustable mounting shaft 50. Attached to the free end of bimetal strip 48 is a first single-pole, double-throw mercury switch 52 having electrodes 54, 56, and 58 which are sealed inside a glass bulb 60 along with a blob of mercury 62. Bimetal 48 is wound so as to cause bulb 60 to tilt counterclockwise in response to a decrease in ambient temperature.

The mercury 62 is effective to electrically connect electrodes 54 and 56 when the bulb 60 is tilted sufficiently in a counterclockwise direction and to connect electrodes 56 and 58 when the bulb 60 is tilted sufficiently in a clockwise direction. There is a dead space between the two connecting positions wherein neither electrodes 54 and 56 nor electrodes 56 and 58 are connected. This dead space is passed through quickly each time mercury 62 moves from one connecting position to another in response to sufficient temperature change sensed by bimetal 48. Although the time duration of the dead space may vary slightly due to rate of temperature change and may vary from switch to switch, the time duration is at least 40 milliseconds. As will be hereinafter shown, this short dead time is utilized to ensure de-energizing of the heating system controller 30.

A first temperature adjustment arm 64, for manually setting the higher of two desired space temperatures to be maintained, has its inner end press fitted on the shaft 50 so that the shaft 50 and the arm 64 rotate together. The outer end of adjustment arm 64 is designated "HI" and extends externally from the housing 12 for cooperation with a graduated temperature scale (not shown).

Attached in a similar manner to the free end of a second bimetal strip 66 is a second single-pole, double-throw mercury switch 68 comprising electrodes 70, 72, and 74, and a blob of mercury 76, sealed in a glass bulb 78. Bimetal 66 is wound so as to cause bulb 78 to tilt counterclockwise in response to a decrease in ambient temperature. The inner end of bimetal strip 66 is attached to a second rotatably adjustable mounting shaft 80. Attached in a similar manner to the second mounting shaft 80 is a second temperature adjustment arm 82, having its outer end designated "LO", for manually setting the lower of the two desired space temperatures to be maintained. Although for purposes of illustration the mounting shafts 50 and 80 are shown as being mounted to housing 12 in spaced relationship with each other, it is to be understood that they are coaxially mounted so as to minimize the overall length and width of the housing 12 and to simplify the application of equal quantities of anticipation heat to bimetals 48 and 66. The coaxial mounting can be any suitable construction, the only requirement being that adjustment arms 64 and 82 are adjustable relative to each other.

A timer, indicated generally at 86, includes a single-pole, double-throw switch, indicated generally at 88, comprising spaced fixed contacts 90 and 92 and a movable contact 94. Fixed contact 90 is connected by leads 96 and 98 to the center electrode 56 of mercury switch 52 and fixed contact 92 is connected by leads 100 and 102 to the center electrode 72 of mercury switch 68.

Switch 88, shown more clearly in FIGS. 7 and 10, is a bistable, over-center, toggle switch actuated by rotational movement of a generally square-shaped member 104 pivotal on a shaft 106 mounted in a wall of the timer case. Movable contact 94 is connected to the left end of a flat switch blade 108 having stable positions on either side of an instable center position. The switch blade 108, shown more clearly in FIG. 9, has a center compression leg 110 joined at the left end to outer tension legs 112. The right end of outer tension legs 112 are anchored to a fixed conductive point 114. A serpentine compression spring 116 is interposed between the right end of the center compression leg 110 and a V-shaped groove 118 in pivoted member 104. When member 104 is caused to rotate sufficiently clockwise about shaft 106 by means to be hereinafter described, switch 88 is actuated in a snap-action manner to the position shown in FIG. 7 wherein contacts 92 and 94 are closed. When pivoted member 104 is subsequently caused to rotate sufficiently counterclockwise, switch 88 is actuated to the position shown in FIG. 10 wherein contacts 90 and 94 are closed. The parameters, such as the composition and dimensions of springs 108 and 116, are such that the force to actuate switch 88 from one bistable position to the other is extremely low.

Circuit connections for selectively connecting mercury switches 52 and 68 in circuit with the timer switch 88 to control the energizing of the fan relay 28, the heating system controller 30, and the cooling system controller 32, and to control the recharging of the battery 238, include a "COOL", "OFF", "HEAT" system selector switch 120 and a fan selector switch 122.

The fan selector switch 122 includes a shorting bar 124 movable to positions of "ON" or "AUTO". When in the "ON" position, shorting bar 124 connects terminals 126 and 128, causing the fan relay 28 to be energized by the transformer secondary winding 24 through lead 26, terminal RH, lead 46, terminal RC, a lead 130, terminal 126, shorting bar 124, terminal 128, a lead 132, a lead 133, terminal G, and leads 40 and 34. Thus, when the fan selector switch 122 is in the "ON" position, the fan motor (not shown) is constantly energized irrespective of the position of the system selector switch 120. The fan selector switch 122 also has an "AUTO" position wherein shorting bar 124 connects terminals 134 and 136. Terminal 136 is connected by lead 133 to terminal G. When the fan selector switch 122 is in the "AUTO" position, energizing of the fan relay 28 is contingent upon the system selector switch 120 being in the "COOL" position as will be hereinafter described. When the system selector switch 120 is in the "HEAT" position and the fan selector switch 122 is in the "AUTO" position, operation of the fan motor is controlled by separate circuit means (not shown) including temperature responsive switching means responsive to furnace plenum temperature.

The system selector switch 120 includes three shorting bars 138, 140, and 142, which are mechanically linked together so that the bars are movable together. When the system selector switch 120 is in the "HEAT" position shown in FIGS. 1, 2, 3, and 4, shorting bar 138 connects terminals 144 and 146, shorting bar 140 connects terminals 148 and 150, and shorting bar 142 connects terminals 152 and 154. When the system selector switch 120 is in the "COOL" position shown in FIG. 5, shorting bars 138, 140, and 142 connect terminal pairs 156 and 158, 160 and 162, and 164 and 166, respectively. When the system selector switch 120 is in the "OFF" position shown in FIG. 6, shorting bars 138, 140, and 142 connect terminal pairs 168 and 170, 172 and 174, and 176 and 178, respectively.

"COOL" position terminal 158 is connected by a lead 180 to electrode 74 in mercury switch 68 and by lead 180 and a lead 182 to electrode 58 in mercury switch 52. Terminal 158 is also connected by a lead 184 to "HEAT" position terminal 152. "COOL" position terminal 156 is connected by a lead 186 and a lead 188 to terminal RC and to "COOL" position terminal 164.

"COOL" position terminal 162 is connected by a lead 190 to terminal Y, and by lead 190 and a lead 191 to terminal 134 of the fan selector switch 122. "COOL" position terminal 160 is connected by a lead 192 and a lead 194 to the fixed conductive point 114 in timer 86. Terminal 160 is also connected to "HEAT" position terminal 146 through lead 192, a lead 196, a heating anticipation resistor 198, and a lead 200. "COOL" position terminal 166 is connected to a junction 202 through a lead 204, a cooling anticipation resistor 206 and a lead 208.

"HEAT" position terminal 144 is connected by a lead 210 to terminal W and by lead 210 and a lead 212 to "OFF" position terminal 176. "HEAT" position terminal 150 is connected by a lead 214 to a lead 216 which is connected between electrode 54 in mercury switch 52 and electrode 70 in mercury switch 68. "HEAT" position terminal 148 is connected by a lead 218 to terminal RH and by a lead 220 to "OFF" position terminal 172. "HEAT" position terminal 154 is connected to junction 202 through a lead 222, a charging resistor 224, and a lead 226.

"OFF" position terminal 174 is connected by a lead 228 to lead 216, and "OFF" position terminal 178 is connected by a lead 230 to lead 222.

The timer 86 includes a 24-hour electrically operated clock 232 connected by leads 234 and 236 to a small storage battery or batteries 238 for the energizing thereof. The clock 232 may have any suitable electrically operated movement capable of keeping time accurately, of providing sufficient torque to operate the timer switch 88, and one that consumes a sufficiently small amount of electrical energy. By way of example, a clock movement comprising an integrated electronic circuit and a fixed frequency element, such as a quartz crystal, was found to perform satisfactorily when energized by a small rechargeable battery.

One side of the battery 238 is connected by a lead 240 to junction 202 and the other side of the battery 238 is connected through a lead 242, a diode 244, and a lead 246 to lead 216. The battery 238 is of the rechargeable type, such as nickel cadmium, and is connected across the transformer secondary winding 24 through various conductive paths which will be hereinafter described, so as to maintain a sufficient charge thereon to operate the timer 86.

Clock 232 includes a clock face 248 which is rotated in a counterclockwise direction by a drive shaft 250, as shown in FIG. 7, and is provided with suitable time indicia covering a 24-hour time period. Time is read by reference to an arrow 252 and the word "TIME" 254 fixed with respect to the rotating clock face 248. For example, in FIG. 1, the time is 2:00 a.m.; in FIG. 3, the time is 10:00 a.m.

A pair of similarly constructed switch actuator arms 256 and 258 bearing the designations "LO" and "HI", respectively, are rotatably adjustable with respect to the clock face 248 and are movable therewith. Referring to FIGS. 7 and 8, each of the switch actuator arms 256 and 258 is frictionally mounted at one end to clock shaft 250 for rotation therewith. A pin 260 is secured to the underside of switch actuator arms 256 and 258. Pin 260 is radially positioned on "LO" actuator arm 256 so that pin 260 will contact a segment 262 of the square-shaped pivoted member 104 at a point below the shaft 106 as arm 256 is rotated with the clock face 248 in a counterclockwise direction. This action will cause member 104 to be rotated in a clockwise direction. When member 104 is rotated sufficiently clockwise, movable switch contact 94 is snapped into contact with fixed contact 92, this contact position being shown in FIG. 7. Because switch 88 is bistable, contacts 92 and 94 remain in contact after pin 260 has subsequently rotated past member 104.

Pin 260 is radially positioned on "HI" actuator arm 258 so that pin 260 will contact a segment 264 of the member 104 at a point above the shaft 106 as arm 258 is rotated with the clock face 248 in a counterclockwise direction. This will cause member 104 to be rotated in a counterclockwise direction, causing movable contact 94 to be snapped out of contact with fixed contact 92 and into contact with fixed contact 90, this contact position being shown in FIG. 10. Again, because switch 88 is bistable, contacts 90 and 94 remain in contact after pin 260 has subsequently rotated past member 104.

The above described switching arrangement requires the application of considerably less torque to the clock shaft 250 by the clock movement than would be required to effect the same switch functions with the usual conventional arrangement wherein a monostable switch is actuated by cams driven by the clock movement. Minimizing the torque required permits reduction of the electrical energy required and therefore a reduction in storage battery size.

Figure 11:
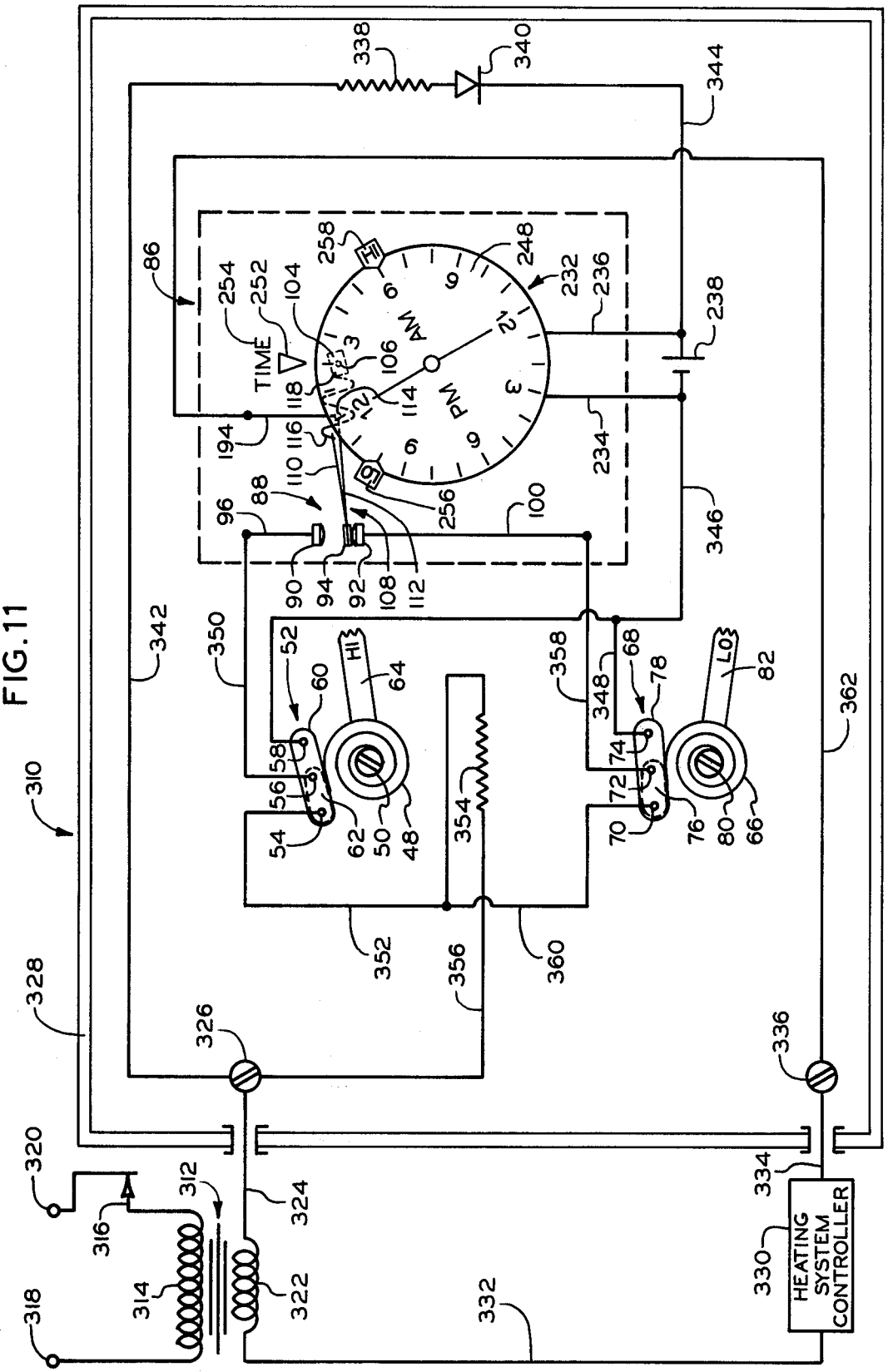
FIG. 11 is a diagrammatic illustration of a heating system including a timer controlled space thermostat constructed in accordance with the present invention.

Referring now to FIG. 11, illustrated is a timer controlled space thermostat 310 for controlling only a heating system. Because the timer, the battery, and the temperature responsive elements including the mercury switches are identical to those previously described, the same reference numerals are used for those components.

In FIG. 11, a transformer 312 has its primary winding 314 connected through a high temperature limit switch 316 to conventional power source terminals 318 and 320. One side of the transformer secondary winding 322 is connected by a lead 324 to a screw terminal 326 secured to the thermostat housing 328. A heating system controller 330 is connected to the other side of the transformer secondary winding 322 by a lead 332 and by a lead 334 to a screw terminal 336 in housing 328.

A charging resistor 338 and a diode 340 are series connected between terminal 326 and one side of the battery 238 by leads 342 and 344. The other side of the battery 238 is connected by a lead 346 to electrode 58 in mercury switch 52 and by lead 346 and a lead 348 to electrode 74 in mercury switch 68.

The center electrode 56 in mercury switch 52 is connected by a lead 350 and lead 96 to fixed contact 90 in timer switch 88. Electrode 54 in mercury switch 52 is connected through a lead 352, a heating anticipation resistor 354, and a lead 356 to terminal 326. Center electrode 72 in mercury switch 68 is connected by a lead 358 and lead 100 to the fixed contact 92 in timer switch 88. Electrode 70 in mercury switch 68 is connected through a lead 360, lead 352, resistor 354, and lead 356 to terminal 326. A lead 362 is connected between terminal 336 and lead 194 in the timer 86.

While FIG. 11 illustrates a heating system, it will be appreciated that a similar circuit arrangement can be utilized to control a cooling system.

OPERATION

Referring to FIG. 1, in operation, temperature adjustment arm 64, identified as "HI", is adjusted to indicate on a temperature scale (not shown) the higher of the two desired space temperatures to be maintained, and temperature adjustment arm 82, identified as "LO", is adjusted to indicate the lower of the two temperatures.

The timer switch actuator arm 256, marked "LO", is rotated on the clock face 248 to indicate the clock time at which the lower temperature time period is to commence. The actuator arm 258, marked "HI", is rotated on the clock face 248 to indicate the clock time at which the higher temperature time period is to commence. The operation of thermostat 10 will now be described for a condition wherein the lower temperature time period is to commence at 10:00 p.m. and the higher temperature time period is to commence at 6:00 a.m. Accordingly, "LO" actuator arm 256 is set at the 10:00 p.m. position on the clock face 248 and "HI" actuator arm 258 is set at the 6:00 a.m. position.

In FIG. 1, the system selector switch 120 is in the "HEAT" position, as it would be during the heating season, clock time is 2:00 a.m., and bimetal 48 has responded to a decrease in space temperature sufficient to cause tilting of mercury switch 52 and the connection of electrodes 54 and 56. This connection of electrodes 54 and 56 is ineffective, however, to cause energizing of the heating system controller 30 since fixed contact 90, connected to the center electrode 56, is open.

Because "LO" temperature adjustment arm 82 is set to a lower temperature setting than "HI" adjustment arm 64, it requires a greater decrease in ambient temperature for bimetal 66 to effect connection of electrodes 70 and 72 in mercury switch 68 then it does for bimetal 48 to effect connection of electrodes 54 and 56 in mercury switch 52. When electrodes 70 and 72 are connected by mercury 76, as shown in FIG. 1, the heating system controller 30 is then energized through the following circuit: transformer secondary winding 24, lead 26, terminal RH, lead 218, terminal 148, shorting bar 140, terminal 150, lead 214, lead 216, electrode 70, mercury 76, electrode 72, leads 102 and 100, fixed contact 92, movable contact 94, switch blade 108, leads 194 and 196, heating anticipation resistor 198, lead 200, terminal 146, shorting bar 138, terminal 144, lead 210, terminal W, lead 42, heating system controller 30, and lead 36 back to the secondry winding 24.

Figure 2:
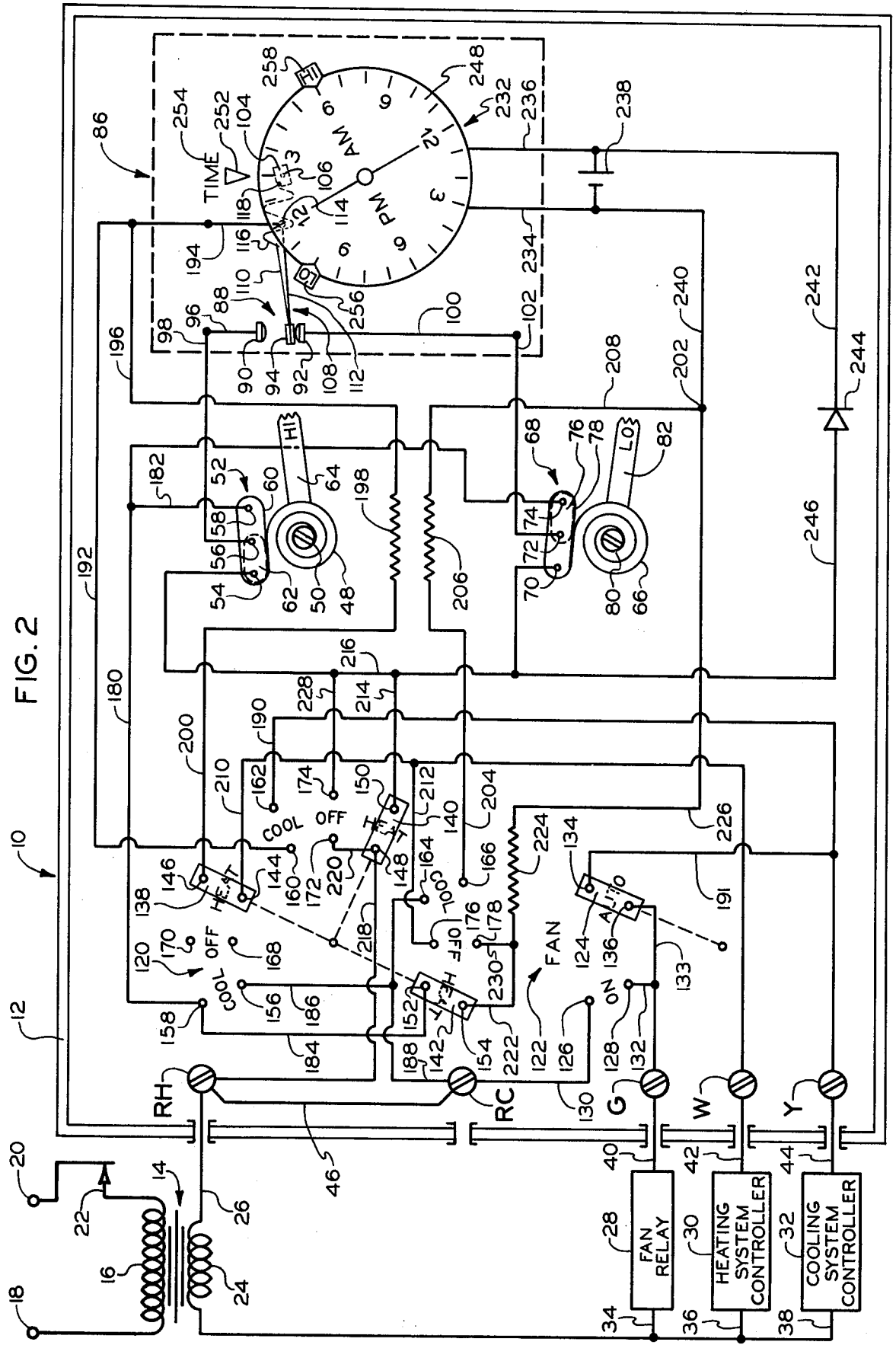

Bimetal 66 subsequently responds to an increase in ambient temperature by tilting mercury switch 68 clockwise. Upon sufficient tilting thereof, mercury 72 disconnects electrodes 70 and 72, breaking the electrical circuit to the heating system controller 30, and subsequently connects electrodes 72 and 74, making the electrical circuit to the battery 238 for recharging battery 238. Referring to FIG. 2, when electrodes 72 and 74 are connected, battery 238 is rechargeable through the following circuit: transformer secondary winding 24, lead 26, terminal RH, lead 218, terminal 148, shorting bar 140, terminal 150, lead 214, lead 216, lead 246, diode 244, lead 242, battery 238, lead 240, lead 226, charging resistor 224, lead 222, terminal 154, shorting bar 142, terminal 152, lead 184, terminal 158, lead 180, electrode 74, mercury 76, electrode 72, leads 102 and 100, contacts 92 and 94, switch blade 108, leads 194 and 196, heating anticipation resistor 198, lead 200, terminal 146, shorting bar 138, terminal 144, lead 210, terminal W, lead 42, leading system controller 30, and lead 36 back to the secondary winding 24. The quantity of current flow through the above recharging circuit is sufficient to provide an adequate charging rate through resistor 224 to maintain the battery 238 at substantially full charge.

There exists a transitory dead time period of at least 40 milliseconds between the time electrodes 70 and 72 are disconnected and the time electrodes 72 and 74 are connected. This discrete, non-conductive dead time is of sufficient time duration to ensure the de-energizing of the heating system controller 30. In particular, if the heating system controller 30 is an electromagnetically operated gas valve, this brief dead time is sufficient time to allow magnetic forces, which hold the valve open, to decay to the level at which the gas valve will be closed before connecting the gas valve in a circuit of considerably lower power level which is ineffective to open the valve but which, in the absence of a complete electrical break, may prevent the valve from closing.

When bimetal 66 subsequently responds to a sufficient decrease in ambient temperature, electrodes 72 and 74 are disconnected, de-energizing the recharging circuit, and electrodes 70 and 72, after a dead time the same as described above, are subsequently connected, energizing the heating system controller 30, this position being as shown in FIG. 1. With timer switch contacts 92 and 94 closed, energizing of the heating system controller 30 and energizing of the recharging circuit for battery 238 are controlled in the above described manner by mercury switch 68. Under these conditions, the lower of the two desired levels of space temperature, as determined by the setting of the "LO" temperature adjustment arm 82, is maintained.

When the clock 232 subsequently rotates counterclockwise to the position wherein the "HI" actuator arm 258 registers with the time indicator arrow 252, this occurring at 6:00 a.m., the pin 260 on the "HI" actuator arm 258 contacts the upper segment 264 of the pivoted member 104, causing member 104 to rotate counterclockwise on the shaft 106 and actuate The switch 88, switching movable contact 94 out of engagement with contact 92 and into engagement with contact 90. Since electrode 72 in mercury switch 68 is connected to contact 92, now open, mercury switch 68 is no longer effective to control the energizing of heating system controller 30 nor the recharging of battery 238, and the control thereof is transferred to mercury switch 52.

Figure 3:
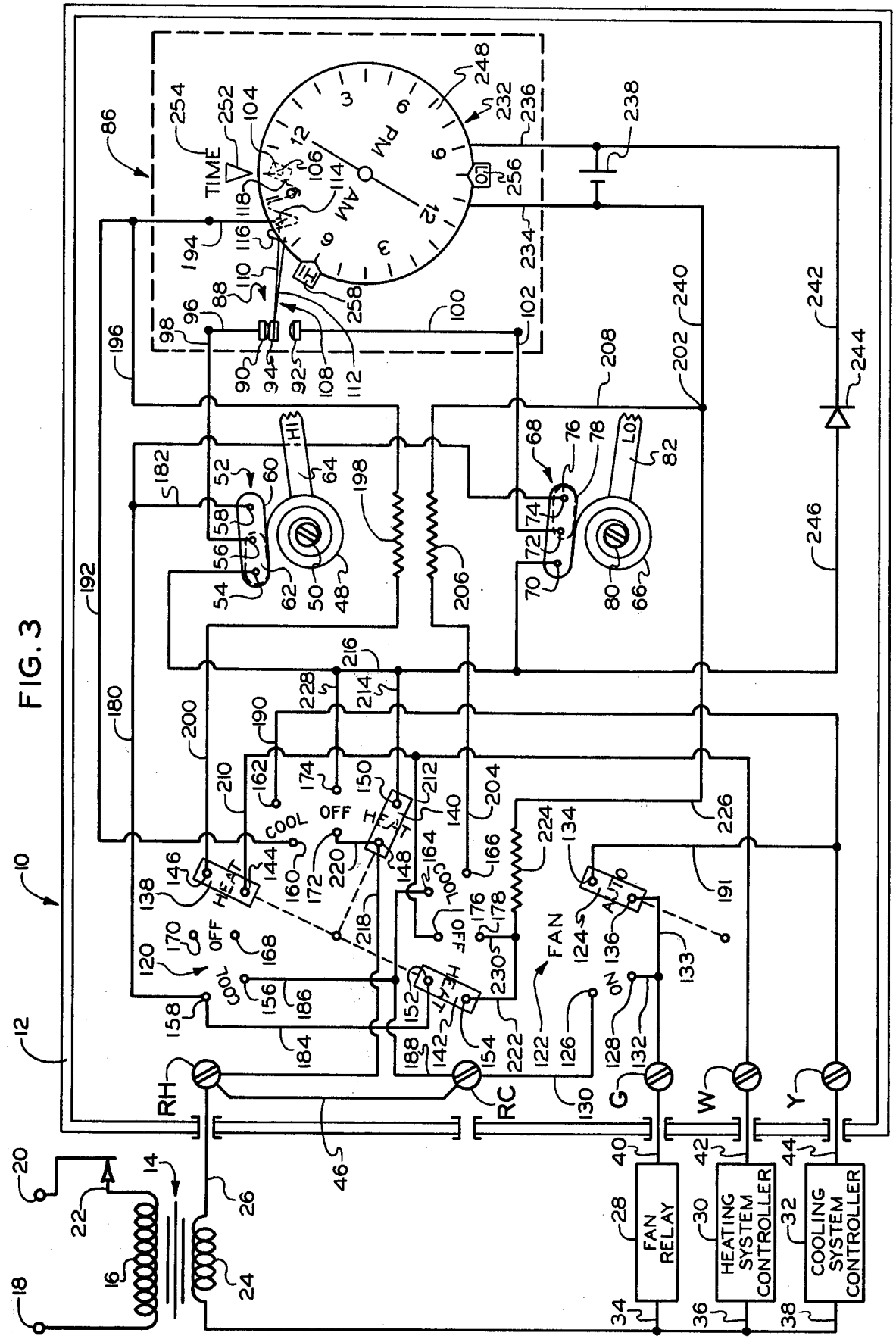

Referring to FIG. 3 wherein the above described timer switching has occurred and the clock time has subsequently advanced to 10:00 a.m., when electrodes 54 and 56 are connected by mercury 62 due to a sufficient decrease in ambient temperature sensed by bimetal 48 to tilt mercury switch 52 counterclockwise, the heating system controller 30 is then energized through mercury switch 52 and timer switch contacts 90 and 94 instead of through mercury switch 68 and timer switch contacts 92 and 94, the circuit being: transformer secondary winding 24 lead 26, terminal RH, lead 218, terminal 148, shorting bar 140, terminal 150, lead 214, lead 216, electrode 54, mercury 62, electrode 56, leads 98 and 96, fixed contact 90, movable contact 94, switch blade 108, leads 194 and 196, heating anticipation resistor 198, lead 200, terminal 146, shorting bar 138, terminal 144, lead 210, terminal W, lead 42, heating system controller 30, and lead 36 back to the secondary winding 24.

Figure 4:
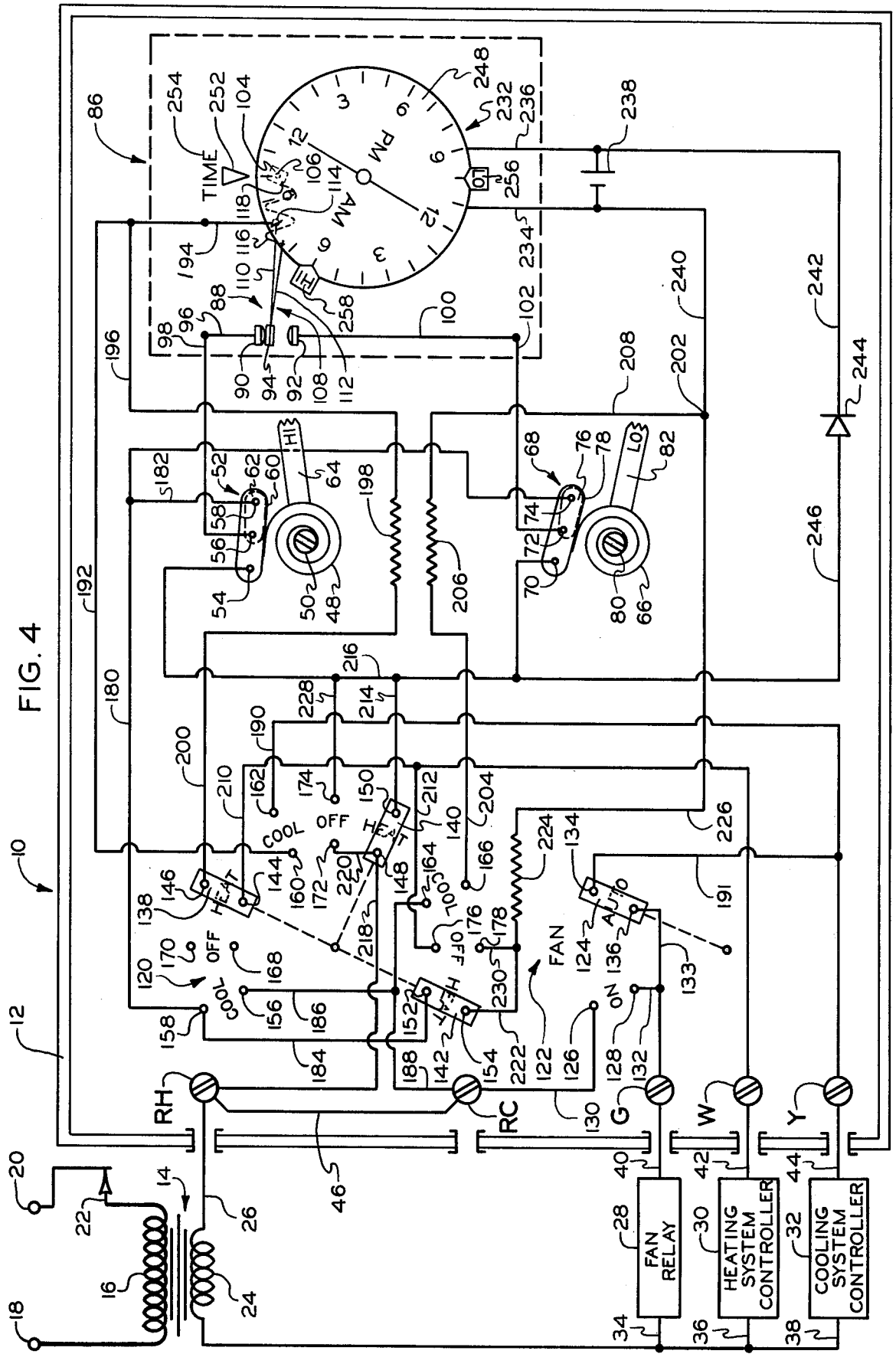

When bimetal 48 subsequently responds to a sufficient increase in ambient temperature, electrodes 54 and 56 are disconnected and electrodes 56 and 58 are subsequently connected, as shown in FIG. 4, the previously described dead time between disconnection and connection being sufficient to ensure de-energizing of the heating system controller 30. When electrodes 56 and 58 are connected, battery 238 is recharged through mercury switch 52 and timer switch contacts 90 and 94 instead of through mercury switch 68 and timer switch contacts 92 and 94, the circuit being: transformer secondary winding 24, lead 26, terminal RH, lead 218, terminal 148, shorting bar 140, terminal 150, lead 214, lead 216, lead 246, diode 244, lead 242, battery 238, lead 240, lead 226, charging resistor 224, lead 222, terminal 154, shorting bar 142, terminal 152, lead 184, terminal 158, lead 180, lead 182, electrode 58, mercury 62, electrode 56, leads 98 and 96, fixed contact 90, movable contact 94, switch blade 108, leads 194 and 196, heat anticipating resistor 198, lead 200, terminal 146, shorting bar 138, terminal 144, lead 210, terminal W, lead 42, heating system controller 30, and lead 36 back to transformer secondary winding 24.

When bimetal 48 responds to a sufficient decrease in ambient temperature, electrodes 56 and 58 are disconnected, de-energizing the charging circuit, and electrodes 54 and 56, after a dead time the same as previously described, are connected, energizing the heating system controller 30, this position being as shown in FIG. 3.

Therefore, commencing at 6:00 a.m., at which time the timer switch contacts 90 and 94 close, mercury switch 52 controls the energizing of the heating system controller 30 and the recharging circuit, and maintains the higher of the two desired levels of space temperature as determined by the setting of the "HI" temperature adjustment arm 64.

When clock 232 subsequently rotates counterclockwise to the position wherein the "LO" actuator arm 256 is in registry with the time indicator arrow 252, this occurring at 10:00 p.m., the pin 260 on the "LO" actuator arm 256 contacts the lower segment 262 of the member 104, causing it to rotate clockwise about the shaft 106 and actuate timer switch 88, switching movable contact 94 out of engagement with contact 90 and into engagement with contact 92. Therefore, from 10:00 p.m. until 6:00 a.m., at which time the "HI" actuator arm 258 is again effective to actuate switch 88, the lower of the two temperature levels will be maintained by mercury switch 68 in the manner previously described.

If there is a power interruption at terminals 18 and 20 or if the high temperature limit switch 22 opens its contacts during the above operation of the heating system, transformer 14 is de-energized. However, since the clock 232 is energized by the battery 238, the clock 232 remains energized so that clock time remains accurate.

Figure 5:
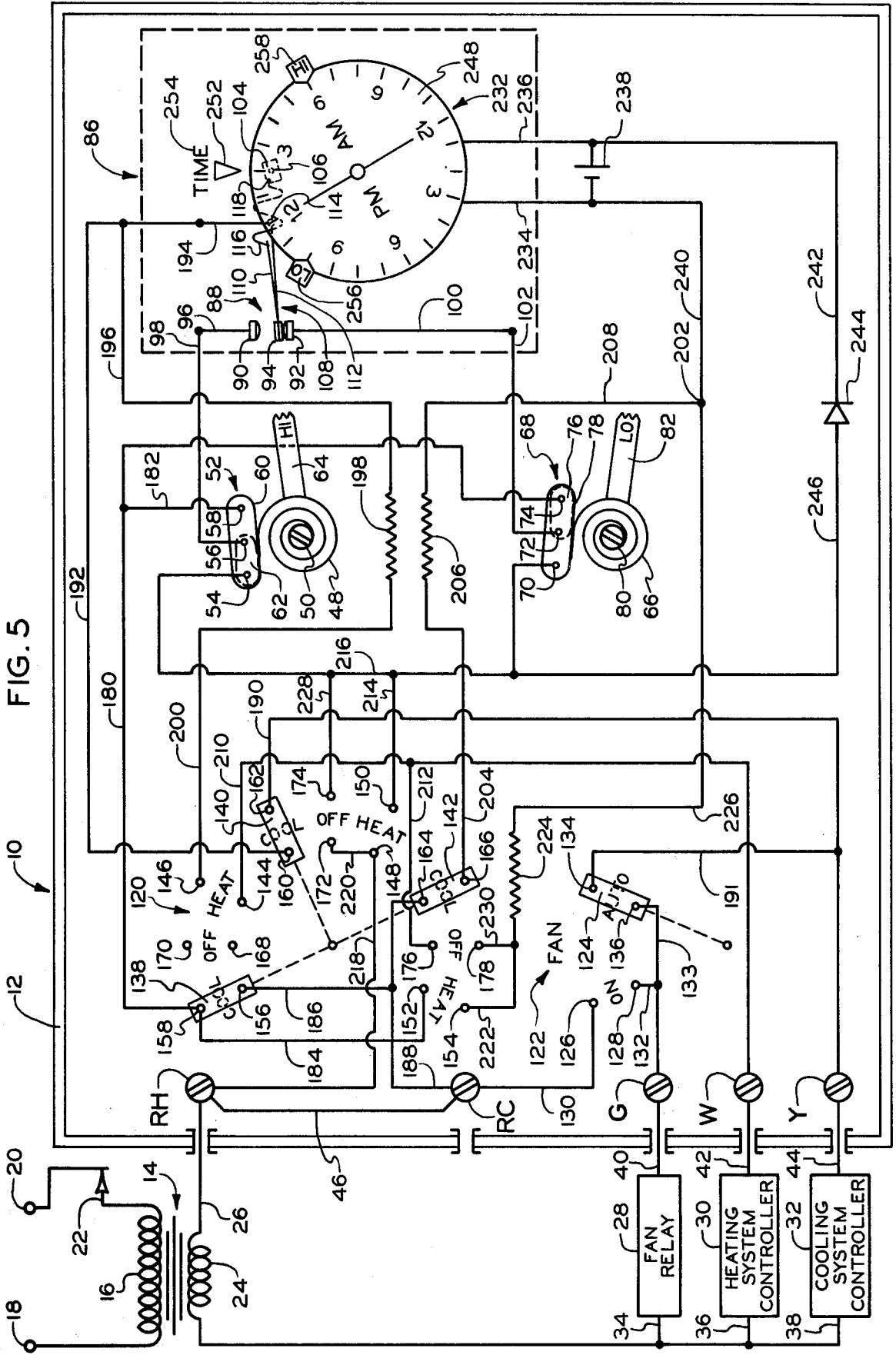
FIG. 5 is a diagrammatic illustration similar to FIG. 2, showing the system in the "COOL" mode.

During operation of the cooling system, the system selector switch 120 is in the "COOL" position as shown in FIG. 5. The operation of the cooling system will now be described for the condition wherein, again, the lower temperature time period is to commence at 10:00 p.m. and the higher temperature time period is to commence at 6:00 a.m.

With timer switch contacts 92 and 94 closed, as shown in FIG. 5, mercury switch 68 is effective to again maintain the lower of the two temperatures. When switch 68 has tilted clockwise due to a sufficient increase in ambient temperature, as shown in FIG. 5, electrodes 72 and 74 are connected and the cooling system is energized through the following circuit: transformer secondary winding 24, lead 26, terminal RH, lead 46, terminal RC, leads 188 and 186, terminal 156, shorting bar 138, terminal 158, lead 180, electrode 74, mercury 76, electrode 72, leads 102 and 100, timer switch contacts 92 and 94, switch blade 108, leads 194 and 192, terminal 160, shorting bar 140, terminal 162, lead 190, terminal Y, lead 44, cooling system controller 32, and lead 38 back to secondary winding 24. Also the fan relay 28 is energized through lead 191, terminal 134, shorting bar 124, terminal 136, lead 133, terminal G, and leads 40 and 34.

When mercury switch 68 tilts sufficiently counterclockwise due to a subsequent decrease in ambient temperature, electrodes 72 and 74 are disconnected, de-energizing the cooling system controller 32 and the fan relay 28, and electrodes 70 and 72 are connected, energizing the recharging circuit. Battery 238 is recharged through the following circuit: transformer secondary winding 24, lead 388, cooling system controller 32, lead 44, terminal Y, lead 190, terminal 162, shorting bar 140, terminal 160, leads 192 and 194, switch blade 108, timer switch contacts 94 and 92, leads 100 and 102, electrode 72, mercury 76, electrode 70, leads 216 and 246, diode 244, lead 242, battery 238, leads 240 and 208, cooling anticipation resistor 206, lead 204, terminal 166, shorting bar 142, terminal 164, lead 188, terminal RC, lead 46, terminal RH, and lead 26 back to the tranformer secondary winding 24. It will be noted that in the above recharging circuit, the cooling anticipation resistor 206 serves a dual function, providing anticipation and providing an adequate charging rate to maintain the battery 238 at substantially full charge.

Subsequent rotation of the clock 232 to the position wherein the "HI" actuator arm 258 is in registry with the time indicating arrow 252, this occurring at 6:00 a.m., effects the closing of contacts 90 and 94 in the manner previously described, thereby transferring control of the energizing of the cooling system controller 32 and the recharging of the battery 238 to the mercury switch 52 which is effective to again maintain the higher of the two desired levels of temperature. When electrodes 56 and 58 in mercury switch 52 are connected by mercury 62, the cooling system controller 32 is energized through the following circuit: transformer secondary winding 24, lead 26, terminal RH, lead 46, terminal RC, leads 188 and 186, terminal 156, shorting bar 138, terminal 158, leads 180 and 182, electrode 58, mercury 62, electrodde 56, leads 98 and 96, timer switch contacts 90 and 94, switch blade 108, leads 194 and 192, terminal 160, shorting bar 140, terminal 162, lead 190, terminal Y, lead 44, cooling system controller 32, and lead 38 back to transformer secondary winding 24. Also the fan relay 28 is energized as previously described.

When mercury switch 52 tilts sufficiently counterclockwise due to a subsequent decrease in ambient temperature, electrodes 56 and 58 are disconnected, de-energizing the cooling system controller 32 and the fan relay 28, and electrodes 54 and 56 are connected energizing the recharging circuit. Battery 238 is recharged through the following circuit: transformer secondary winding 24, lead 38, cooling system controller 32, lead 44, terminal Y, lead 190, terminal 162, shorting bar 140, terminal 160, leads 192 and 194, switch blade 108, timer switch contacts 94 and 90, leads 96 and 98, electrode 56, mercury 62, electrode 54, leads 216 and 246, diode 44, lead 242, battery 238, leads 240 and 208, cooling anticipation resistor 206, lead 204, terminal 166, shorting bar 142, terminal 164, lead 188, terminal RC, lead 46, terminal RH, and lead 26 back to transformer secondary winding 24. Therefore, beginning at 6:00 a.m., the recharging of battery 238 and the maintaining of the higher of the two desired levels of space temperature will be controlled by mercury switch 52.

When the clock 232 subsequently rotates to the position wherein the "LO" actuator arm 256 is below the time indicator arrow 252, this occurring at 10:00 p.m., the "LO" actuator arm 256 actuates the timer switch 88 in the same manner previously described, effecting the closing of contacts 92 and 94. With contacts 92 and 94 closed, mercury switch 68 is effective to again control the recharging of battery 238 and the energizing of the cooling system controller 32 in the manner previously described. Therefore, from 10:00 p.m. until 6:00 a.m., at which time the "HI" actuator arm 258 is again effective to actuate the timer switch 88, the lower of the two levels of space temperature is maintained by the operation of mercury switch 68.

Figure 6:
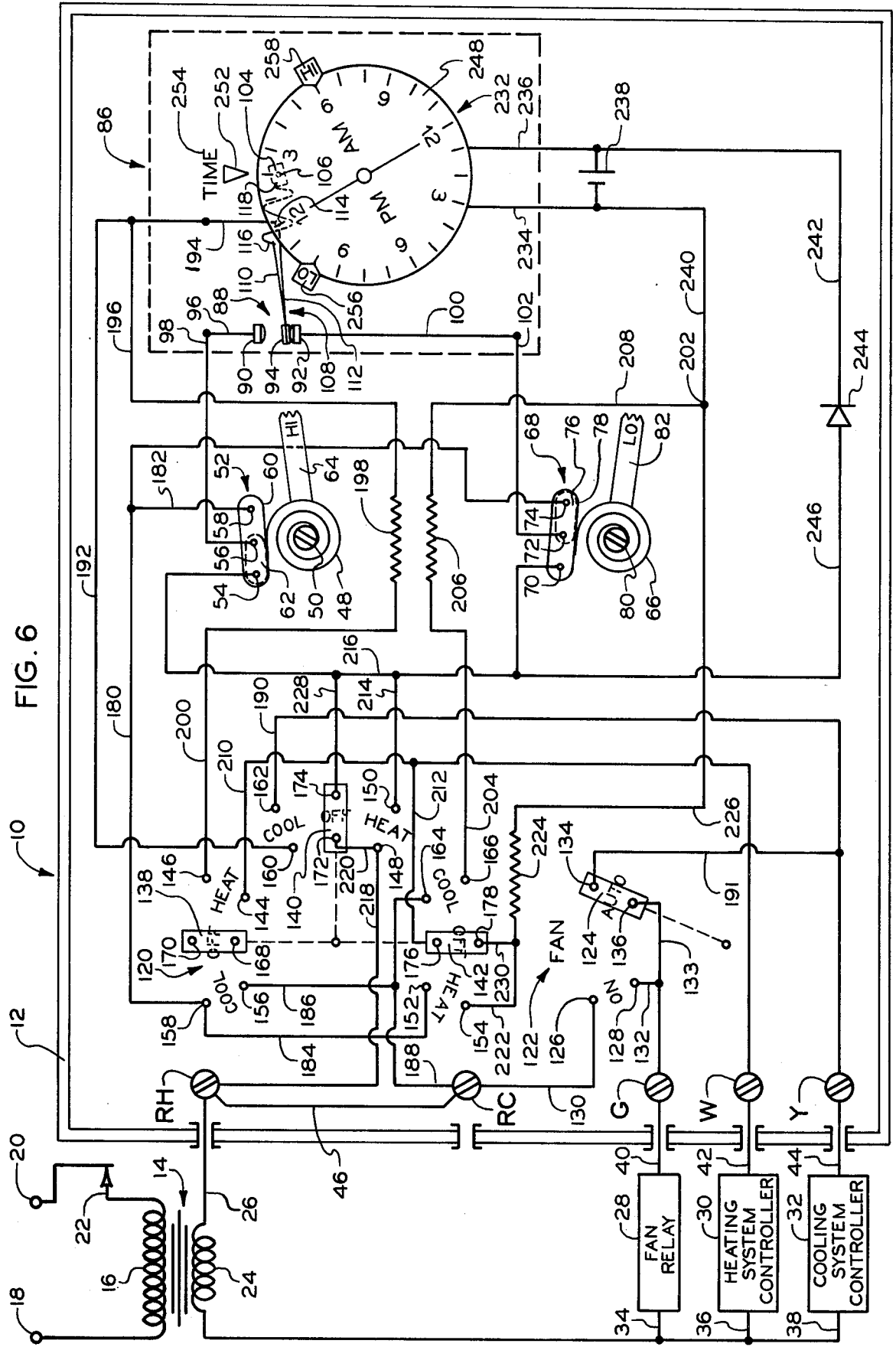
FIG. 6 is a diagrammatic illustration similar to FIG. 5, showing the system in the "OFF" mode.

Referring to FIG. 6 wherein the system selector switch is in the "OFF" position, the battery 238 is constantly in a recharging circuit, regardless of the positions of mercury switches 52 and 68 and regardless of the position of the timer switch 88. The recharging circuit is: transformer secondary winding 24, lead 26, terminal RH, lead 218, terminal 148, lead 220, terminal 172, shorting bar 140, terminal 174, leads 228, 216, and 246, diode 244, lead 242, battery 238, leads 240 and 226, charging resistor 224, leads 222 and 230, terminal 278, shorting bar 142, terminal 176, leads 212 and 210, terminal W, lead 42, heating system controller 30, and lead 36 back to the transformer secondary winding 24.

Referring to FIG. 11, therein is shown a timer controlled space thermostat 310 for controlling only a heating system. Space thermostat 310 utilizes the same mercury switches 52 and 68 and the same timer 86 and battery 238 previously described. Control of the energizing of the heating system and of the energizing of a recharging circuit for battery 238 is accomplished in a manner similar to that previously described for FIG. 1 through 4.

Describing the operation of FIG. 11 briefly, the heating system controller 330 is energized to maintain the lower temperature through the following circuit: transformer secondary winding 322, lead 324, terminal 326, lead 356, heating anticipation resistor 354, leads 352 and 360, electrode 70, mercury 76, electrode 72, leads 358 and 100, timer switch contacts 92 and 94, switch blade 108, leads 194 and 362, terminal 336, lead 334, heating system controller 330, and lead 332 back to transformer secondary winding 322.

When timer switch contacts 92 and 94 are made and the mercury switch 68 has tilted clockwise, the heating system controller 330 is de-energized and, after a brief dead time previously described, the battery 238 is recharged, the recharging circuit being: transformer secondary winding 322, lead 324, terminal 326, lead 342, charging resistor 338, diode 340, lead 344, battery 238, leads 346 and 348, electrode 74, mercury 76, electrode 72, leads 358 and 100, timer switch contacts 92 and 94, switch blade 108, leads 194 and 362, terminal 336, lead 334, heating system controller 330, and lead 332 back to the transformer secondary winding 322.

The higher temperature is maintained through mercury switch 52 and timer switch contacts 90 and 94, the circuit being: transformer secondary winding 322, lead 324, terminal 326, lead 356, heating anticipation resistor 354, lead 352, electrod 54, mercury 62, electrode 56, leads 350 and 96, timer switch contacts 90 and 94, switch blade 108, leads 194 and 362, terminal 336, lead 334, heating system controller 330, and lead 332 back to transformer secondary winding 322.

When timer switch contacts 90 and 94 are made and the mercury switch 52 had tilted clockwise, the heating system controller 330 is de-energized and, after a brief dead time previously described, the battery 238 is recharged through the following circuit: transformer secondary winding 322, lead 324, terminal 326, lead 342, charging resistor 338, diode 340, lead 344, battery 238, lead 346, electrode 58, mercury 62, electrode 56, leads 350 and 96, timer switch contacts 90 and 94, switch blade 108, leads 194 and 362, terminal 336, lead 334, heating system controller 330, and lead 332 back to the transformer secondary winding 322.

While a preferred embodiment of the present invention has been illustrated and described in detail in the drawings and foregoing description, it will be recognized that many changes and modifications will occur to those skilled in the art. It is therefore intended by the appended claims, to cover any such changes and modifications as fall within the true spirit and scope of the invention.

I claim:

1. In a timer controlled space thermostat for controlling operation of electrically operated space conditioning apparatus, two double-throw temperature responsive switches arranged to move sequentially to a first conductive position in response to a progressing temperature change in one direction and to move sequentially to a second opposite conductive position in response to progressing temperature change in the opposite direction, timer operated switching means including circuit connections for alternately completing an energizing circuit for the operation of space conditioning apparatus through said double-throw switches when in their said first conductive positions, said timer operated switching means including an electrically operated timer movement, a storage battery connected to said timer movement for the energizing thereof, recharging circuit means for said battery completed through said timer operated switching means and one or the other of said double-throw switches when in their said second conductive position, and said double-throw temperature responsive switches having a discrete non-conductive period when moving from their said first to their said second conductive positions during which neither said space conditioning apparatus nor said recharging circuit means are energized.

2. In a timer controlled space thermostat for controlling operation of space conditioning apparatus control means, an electrically operated timer movement, a rechargeable storage battery connected to said timer movement for the energizing thereof, two double-throw temperature responsive switches, timer operated switching means including circuit means for alternatively connected through one and then the other of said temperature responsive switches, an energizing circuit for the operation of space conditioning apparatus control means and a recharging circuit for maintaining a charge on said battery, one of said temperature responsive switches being adjustable to a temperature set point and having a first conductive position effected by temperature change in one direction from said set point and a second conductive position effected by a temperature change in the opposite direction from said point, the other of said temperature responsive switches being adjustable to a temperature set point lower than said set point of said one switch and having a first conductive position effected by temperature change in one direction from said lower set point and having a second conductive position effected by a temperature change in the opposite direction from said lower set point, both said temperature responsive switches having a discrete non-conductive position between their said first and second conductive positions, said first conductive positions of said switches effective to complete said energizing circuit, said second conductive positions of said switches effective to complete said recharging circuit, and said non-conductive position effective to break both said energizing circuit and said recharging circuit.

3. In a timer controlled space thermostat for controlling operation of space conditioning apparatus control means, two double-throw temperature responsive switches adjustable to respond to preselected levels of space temperature, each switch being actuated to a first conductive position in response to a space temperature change in one direction and being actuated to a second conductive position in response to a space temperature change in the opposite direction, timer operated switching means including an electrically operated timer movement, a rechargeable storage battery connected to said timer movement for the energizing thereof, said timer operated switching means including circuit means for alternating completing an energizing circuit extending through one and then the other of said temperature responsive switch when in their said first conductive positions for the operation of space conditioning apparatus control means, a recharging circuit for said battery being completed through one and then the other of said temperature responsive switches only when in their said second conductive positions, said temperature responsive switches having a transitory non-conductive position between their said first and second conductive positions at which said energizing circuit and said recharging circuit are de-energized.

4. The timer controlled space thermostat claimed in claim 3 in which said timer operated switching means comprises a double-throw switch actuated alternately to opposite closed positions at timed intervals by said timer movement.

5. In a timer controlled space thermostat for controlling operation of heating and cooling apparatus control means, two double-throw temperature responsive switches arranged to be sequentially moved to first conductive positions in response to progressing decrease in space temperature and to be sequentially moved to second conductive positions in response to progressing increase in space temperature, timer operated switching means including an electrically operated timer movement, a rechargeable storage battery connected to said timer movement for the energizing thereof, a double-throw timer switch operative to alternately complete a circuit through one and then the other of said temperature responsive switches, heating circuit connections including a system selector switch means in a first position connecting said temperature responsive switches when in their said first conductive positions to heating apparatus control means through said timer switch and connecting said temperature responsive switches when in their said second conductive positions to a first circuit means for recharging said battery through said timer switch, cooling circuit connections including said system selector switch means in a second position connecting said temperature responsive switches when in their said second conductive positions to cooling apparatus control means through said timer switch and connecting said temperature responsive switches when in their said first conductive positions to a second circuit means for recharging said battery through said timer switch, each of said temperature responsive switches having a discrete non-conductive position when moving between their said conductive positions during which said heating circuit connections and said cooling circuit connections are broken and said first and second recharging circuit means are de-energized.

6. The timer controlled space thermostat claimed in claim 5 wherein said second recharging circuit means includes a resistor which is concurrently effective to limit the recharging rate and to provide cooling anticipation.

7. The timer controlled space thermostat claimed in claim 5 further including a third circuit means independent of said temperature responsive switches and said timer switch for recharging said battery.

8. The timer controlled space thermostat claimed in claim 7 wherein said third recharging circuit means includes said system selector switch means in a third position.

* * * * *